US011431760B2

(12) United States Patent
Reddy et al.

(10) Patent No.: US 11,431,760 B2
(45) Date of Patent: *Aug. 30, 2022

(54) METHOD AND SYSTEM FOR ROUTING IP BASED MESSAGING, VOICE AND VIDEO CALLING BASED ON THE NETWORK PARAMETERS THE DEVICE IS CONNECTED TO AND THE LOCATION

(71) Applicant: RELIANCE JIO INFOCOMM USA, INC., Frisco, TX (US)

(72) Inventors: Gautam Reddy, Plano, TX (US); Mathew Oommen, Frisco, TX (US); Pallavur Sankaranaraynan, Frisco, TX (US); Chao Kan, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,266

(22) Filed: Oct. 26, 2020

(65) Prior Publication Data
US 2021/0044627 A1 Feb. 11, 2021

Related U.S. Application Data

(63) Continuation of application No. 16/734,872, filed on Jan. 6, 2020, now Pat. No. 10,819,754, which is a (Continued)

(51) Int. Cl.
*H04W 40/20* (2009.01)
*H04L 65/1016* (2022.01)
(Continued)

(52) U.S. Cl.
CPC .......... *H04L 65/1016* (2013.01); *H04L 63/00* (2013.01); *H04L 65/1069* (2013.01);
(Continued)

(58) Field of Classification Search
CPC . H04L 65/1016; H04L 65/1069; H04L 63/00; H04L 63/0272; H04L 63/0428;
(Continued)

(56) References Cited

U.S. PATENT DOCUMENTS 7,382,260 B2 6/2008 Agarwal et al.
7,401,131 B2 7/2008 Robertson et al.
(Continued)

FOREIGN PATENT DOCUMENTS

EP 1179244 A1 2/2002
RU 2421811 C2 6/2011
WO 2013061156 A2 5/2013

OTHER PUBLICATIONS

Office Action dated Sep. 20, 2020 from the India Patent Office for co-pending India Application No. 201817004510, 6 pages.
(Continued)

*Primary Examiner* — Wayne H Cai
(74) *Attorney, Agent, or Firm* — Jackson Walker LLP; Christopher J. Rourk

(57) ABSTRACT

A system and method for routing IP-based messaging, voice and video calling, comprising detecting network parameters of a network that a device is connected to, detecting a location of the device and routing the call based on the network parameters and the location.

20 Claims, 2 Drawing Sheets

Related U.S. Application Data continuation of application No. 15/224,228, filed on Jul. 29, 2016, now Pat. No. 10,531,358.

(60) Provisional application No. 62/199,176, filed on Jul. 30, 2015.

(51) Int. Cl.

| | | |
|---|---|---|
| *H04W 8/18* | (2009.01) | |
| *H04W 8/02* | (2009.01) | |
| *H04L 65/1069* | (2022.01) | |
| *H04L 9/40* | (2022.01) | |
| *H04W 12/03* | (2021.01) | |

(52) U.S. Cl.
CPC ............. *H04W 8/02* (2013.01); *H04W 8/18* (2013.01); *H04W 12/03* (2021.01); *H04W 40/20* (2013.01); *H04L 63/0272* (2013.01); *H04L 63/0428* (2013.01)

(58) Field of Classification Search
CPC ......... H04W 12/03; H04W 8/02; H04W 8/18; H04W 40/20
See application file for complete search history.

(56) References Cited

U.S. PATENT DOCUMENTS

| | | | |
|---|---|---|---|
| 7,496,360 B2 | 2/2009 | Sindhwani et al. | |
| 7,701,341 B2 | 4/2010 | Kumar et al. | |
| 7,774,485 B2 | 8/2010 | Patrick et al. | |
| 7,822,860 B2 | 10/2010 | Brown et al. | |
| 7,944,355 B2 | 5/2011 | Kumar et al. | |
| 7,958,544 B2 | 6/2011 | Chen .................... | H04L 63/062 713/183 |
| 8,170,212 B2 | 5/2012 | Pering et al. | |
| 8,195,152 B1 | 6/2012 | Edwards | |
| 8,265,594 B2 | 9/2012 | Davis et al. | |
| 9,100,175 B2 | 8/2015 | Nix ....................... | H04L 9/0869 |
| 2003/0033369 A1 | 2/2003 | Bernhard | |
| 2004/0098306 A1 | 5/2004 | Fitzpatrick et al. | |
| 2005/0044058 A1 | 2/2005 | Matthews et al. | |
| 2005/0050301 A1 | 3/2005 | Whittle et al. | |
| 2006/0020904 A1 | 1/2006 | Aaltonen et al. | |
| 2007/0239819 A1 | 10/2007 | Woods et al. | |
| 2008/0189757 A1 | 8/2008 | Schackow ............. | G06F 21/53 726/1 |
| 2008/0287062 A1 | 11/2008 | Claus et al. | |
| 2009/0228820 A1 | 9/2009 | Kim et al. | |
| 2009/0235299 A1 | 9/2009 | Astrom ............. | H04L 29/06027 725/25 |
| 2010/0049874 A1 | 2/2010 | Chene et al. | |
| 2010/0177711 A1 | 7/2010 | Gum .................... | H04W 88/06 370/329 |
| 2011/0200013 A1 | 8/2011 | Cheng ............... | H04W 36/0011 370/331 |
| 2011/0246624 A1 | 10/2011 | Kato .................. | H04L 65/1016 709/219 |
| 2012/0095905 A1 | 4/2012 | Hodges ............... | G06Q 20/027 705/39 |
| 2012/0174093 A1 | 7/2012 | Davila et al. | |
| 2013/0219263 A1 | 8/2013 | Abrahami | |
| 2015/0138987 A1 | 5/2015 | Lee ...................... | H04W 40/34 370/238 |
| 2015/0201320 A1 | 7/2015 | Narkar ............... | H04L 65/1073 370/328 |
| 2016/0255181 A1 | 9/2016 | Shaltiel ................ | H04M 1/006 455/417 |
| 2016/0373275 A1* | 12/2016 | Al-Asaaed ......... | H04L 63/0272 |

OTHER PUBLICATIONS

Response to Office Action filed Sep. 26, 2018 in the European Patent Office for co-pending European Patent Application No. EP16751730.9, 42 pages.

Office Action dated Sep. 11, 2019 from the European Patent Office for co-pending European Patent Application No. EP16751730.9, 5 pages.

Response to Office Action filed Jan. 17, 2020 in the European Patent Office for co-pending European Patent Application No. EP16751730.9, 10 pages.

Notification Concerning Transmittal of the International Preliminary Report on Patentability dated Feb. 8, 2018 containing the Written Opinion of the International Searching Authority—EPO—for PCT/US2016/044842, 9 pages.

Miller, Sandra Kay, "Facing the Challenge of Wireless Security", Technology News—Computer, Jul. 2001, 3 pages.

Office Action dated Mar. 16, 2018 from the European Patent Office for European Patent Application No. EP16751730.9, 3 pages.

The International Search report and the Written opinion issued by European Patent Office dated Oct. 20, 2016 for the International Patent Application No. PCT/US2016/044842.

Miller, "Facing the Challenge of Wireless Security", Computer, 2002, pp. 16-18, vol. m34, No. 7.

The International Search report and the Written opinion issued by Russian Federal Institute of Industrial Property Office dated Sep. 19, 2013 for the International Patent Application No. PCT/US2013/046640.

The International Search report and the Written opinion issued by USPTO dated Sep. 30, 2015 for the International Patent Application No. PCT/US2015/038683.

The International Search report and the Written opinion issued by EPO dated Dec. 3, 2015 for the International Patent Application No. PCT/US2015/050276.

GSM Association, "VoLTE Service Description and Implementation Guidelines, Version 1.1", www.gsma.com/network2020/wp-com, Mar. 26, 2014, pp. 1-121.

Anonymous et al., "Fritz! Box 6842 LTE: Der Alleskönner mlt Voice-over-LTE", www.lte-anbieter.info/lte-news/fritzbox-6842-lte-der-alleskonner-mit-voice-over-lte, Feb. 27, 2013, pp. 1.

AVM Gmbh, "FRITZ!Box 6842 LTE Einrichten und bedienen", img.billiger.de/dynimg/h5r90H8yeGyX90aFpmTDmHt4H9rycHjeBa9LTdXG2DA41-ZtYq5vi031VpqWBj4_HexpdHaC1z88YR5bxwk6-U/Bedienungsanleitung.pdf, May 1, 2014, pp. 1-212.

The International Search report and the Written opinion issued by Indian Patent Office dated Jun. 22, 2015 for the International Patent Application No. PCT/IB2015/050451.

\* cited by examiner

METHOD AND SYSTEM FOR ROUTING IP BASED MESSAGING, VOICE AND VIDEO CALLING BASED ON THE NETWORK PARAMETERS THE DEVICE IS CONNECTED TO AND THE LOCATION

RELATED APPLICATIONS

The present application is a continuation of U.S. patent application Ser. No. 16/734,872 filed Jan. 6, 2020, which is a continuation of U.S. patent application Ser. No. 15/224,228 filed Jul. 29, 2016, now issued as U.S. Pat. No. 10,531,358 on Jan. 7, 2020, which claims priority to and benefit of U.S. Provisional Patent Application No. 62/199,176, filed Jul. 30, 2015, which is hereby incorporated by reference for all purposes as if set forth herein in its entirety.

TECHNICAL FIELD

The present disclosure relates generally to routing IP-based messaging, voice and video calling, and more specifically to routing IP-based messaging, voice and video calling based on the network parameters of the network that the device is connected to and the location of the device.

BACKGROUND OF THE INVENTION

Devices can use applications to communicate over the Internet, fret such communications do not comply with certain regulatory requirements.

SUMMARY OF THE INVENTION

A system and method for routing IP-based messaging, voice and video calling, comprising detecting network parameters of a network that a device is connected to, detecting a location of the device and routing the call based on the network parameters and the location.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
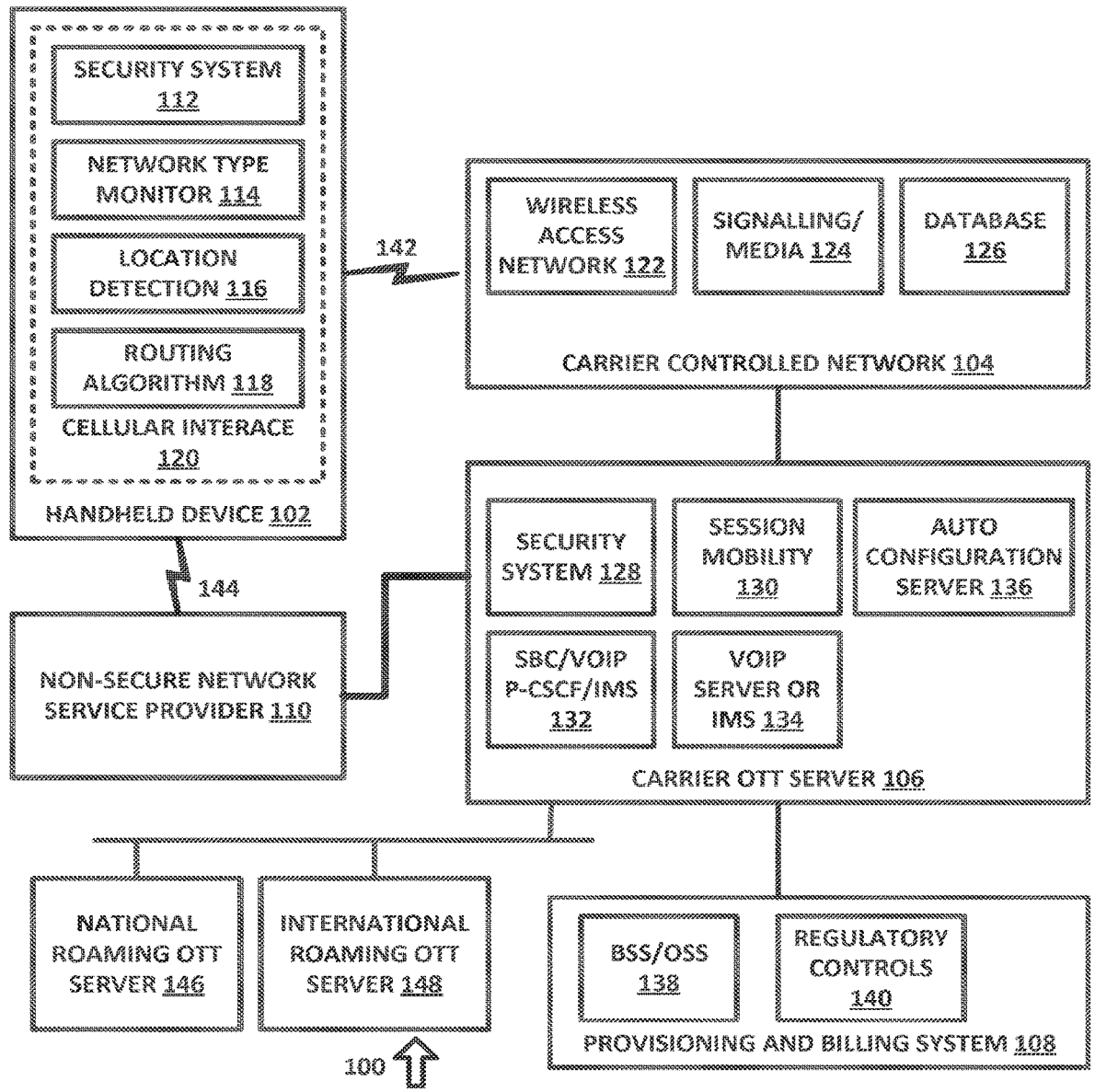
FIG. 1 is a diagram of an OTT client-server architecture for a cellular service provider, in accordance with the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Over-The-Top (OTT) third-party client applications on the market can provide voice, messaging and video capabilities to mobile customers using the Internet and without the need for circuit-switched communications channels, Some third-party applications can provide analytical functions on whether a call should be made or received based on the customer GPS location.

Customers usually download the third-party voice and video calling clients for installation into their devices, to communicate with the application server located in a third-party controlled environment, using the data network provided by the wireless operators as underlying infrastructure.

Usually, the underlying infrastructure (such as a 2G/3G/4G cellular, a WiFi data network or other suitable network or networks) is transparent to the third-party application, and the client communicates with the server using a VPN or encryption for security. Because these applications are available at lower cost and can provide more functionality, customers may rely more upon these applications for the voice and video services than the traditional voice network provided by cellular operators.

To address this challenge, an OTT messaging service, voice and video calling application for cellular providers is disclosed to compete with third-party application providers, which provides critical advantages.

FIG. 1 is a diagram of an OTT client-server architecture 100 for a cellular service provider, in accordance with the present disclosure. OTT client-server architecture 100 includes handheld device 102, carrier-controlled network 104, carrier OTT server 106, provisioning and billing system 108 and non-secure network service provider 110, each of which can be implemented in hardware or a suitable combination of hardware and software, and which can be one or more software applications operating on a special-purpose processor.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The tem "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order cart be rearranged as suitable and is not intended to be limiting unless explicitly stated to be limiting.

Handheld device 102 can be a cellular telephone, a personal computer, a tablet computer or other suitable personal devices that may or may not be handheld, such as watches or optical head mounted displays, and allows a user to communicate with others over a network using multimedia, to view and use multimedia applications over the network, and to perform other suitable functions. Handheld device 102 includes a special purpose processor, such as a reduced instruction set computing (RISC) processor that is configured to provide low power consumption or other suitable special purpose processors. Handheld device 102 can also include one or more of a memory device for storing programming that executes on the processor, a memory device for storing buffered telecommunications data, a memory device for storing one or more network identifiers or other suitable variables a speaker for generating audible sounds, a microphone for converting sounds to electrical signals, a speech encoder for converting the electrical signals into encoded speech data, a display for generating video data images, a user interface for receiving user-entered data, a graphic user interface for generating variable interface screens that can be modified to prompt a user to select one or more choices or to enter one or more data fields, a radio system for generating and transmitting radio frequency signals and for receiving radio frequency signals transmitted from another device, a global positioning system (GPS) system configured to receive radio frequency signals adapted for determining a location, an inertial data system configured to generate data responsive to a change in a direction of motion of the handheld device, and other suitable systems and devices. Handheld device 102 includes cellular interface 120, which further includes security system 112, network type monitor 114, location detection 116, and routing algorithm 118. An advantage for OTT solutions provided by cellular providers is the expansion of services to terminals that have no built-in voice capabilities, like tablet computers. Mobile operators can provide messaging, voice and video calling service for such devices with officially allocated MSISDN numbers.

Cellular interface 120 can be implemented in hardware or a suitable combination of hardware and software, and provides access to a cellular network or data network for handheld device 102. In one exemplary embodiment, cellular interface 120 is an OTT client that provides an integrated solution for circuit-switched and packet-switched voice and data communications, and provides access and functionality for both the OTT application and the traditional original equipment manufacturer (OEM) client inside a handset or other handheld device, using the same wireless core network such as an IP Multimedia Subsystem (IMS). Cellular interface 120 can use the same mobile subscriber integrated services digital network (MSISDN) number (also referred to as a phone number) to make and receive calls, whether the call is going through a cellular voice network using a traditional OEM client, or through the cellular data network or a Wi-Fi data network using the OTT client. The present disclosure allows a user to communication using the same hardware components, such as a "talk" button, and the OTC client of cellular interface 120 can select the appropriate radio layer, based on predefined criteria, by using a routing algorithm or in other suitable manners.

Security system 112 provides a predetermined level of security as a function of a network type, an application type, a location or in other suitable manners. In one exemplary embodiment, security system 112 receives network type data and can determine whether the network is secure, such as when the network is a cellular carrier network, or if the network is not secure, such as when the network includes a non-secure Wi-Fi network services provider or other non-secure segments. In another exemplary embodiment, security system 112 can generate a diagnostic message that returns data that can be used to determine whether a route to an end point, such as such carrier OTT server 106, is entirely over a secure network provided by a cellular carrier network, or if it includes one or more segments that are not secure. Likewise, other suitable processes can also or alternatively be used. If security system 112 determines that the network is not secure, such as for a predetermined type of application, for use in a predetermined location or in other suitable manners, security system 112 can implement additional encryption, can set up a virtual private network connection or can perform other suitable functions to provide a predetermined level of security as a function of the type of network, the type of application, the location or other suitable inputs.

Network type monitor 114 is configured to determine a network type, such as based on the type of network that communications are being transmitted or received on, by using a diagnostic process or in other suitable manners. In one exemplary embodiment, network type monitor 114 can determine whether handheld device 102 is coupled to a secure network 142, a non-secure network 144, can send a message over the network connection to a destination and can receive routing data associated with the message, or can perform other suitable functions.

Location detection 116 receives location data associated with handheld device 102, such as by interfacing with a global positioning system device, by receiving network location data, or in other suitable manners. Location detection 116 can receive a query from security system 112, routing algorithm 118 or other suitable systems and can provide location data or other suitable data in response, such as a data field that indicates that location data is not available, a data field that indicates the date or time on which the location data was obtained, or other suitable data.

Routing algorithm 118 receives location data, network data and other suitable data and generates routing data for an OTT client, such as to comply with regulatory requirements, to provide a predetermined level of security, to provide session mobility or for other suitable purposes. One advantage of the disclosed OTT solution as provided by the cellular provider is session mobility. Because the same core network is used, seamless session mobility can be provided for transferring communications sessions between the cellular and Wi-Fi networks, or for other suitable purposes.

Carrier-controlled network 104 includes wireless access network 122, signaling/media 124 and database 126. In one exemplary embodiment, carrier-controlled network 104 provides cellular communications services, such as call set-up and routing, data packet-switched data network services, cellular handset location tracking and other suitable services Carrier-controller network 104 allows a user of handheld device 102 to communicate with other handheld devices, to access carrier OTT server 106 and other data servers, and to receive data security, by preventing hostile third party access to the channel- and packet-switched data.

Carrier OTT server 106 includes security system 128, session mobility 130, session border controller (SBC) for voice over Internet protocol (VOIP) or a proxy call session control function (P-CSCE) for an IP multimedia subsystem SBC/VOIP P-CSCF/IMS 132, VOIP server or IMS 134 and auto configuration server 136. In addition, carrier OTT server 106 is coupled to national roaming OTT server 146 and international roaming OTT server 148, each of which have equivalent functionality and which are configured to interface with carrier OTT server 106 and handheld device 102, such as in response to a determination by handheld device 102 that a communication session should be established with the P-CSCF associated with national roaming OTT server 146 and international roaming OTT server 148, such as based on the location of the handheld device 102.

Security system 128 coordinates with security system 112 to provide a predetermined level of security for data communications, such as by decryption/encryption, VPN routing or in other suitable manners. In one exemplary embodiment, security system 128 adjusts the level of security provided for an application as a function of the security of the data networks used to deliver the application to a handheld device 102.

Session mobility 130 provides continuous session support for an application, regardless of the data network connections. In one exemplary embodiment, when a user travels between cellular network connections and Wi-Fi network connections, session mobility 130 ensures continuity of a data session during handover between networks, such as by monitoring the MSISDN number of a handheld device, by buffering data, by using proxy, services or in other suitable manners.

SBC/VOIP P-CSCF/IMS 132 provides session border control for voice over Internet protocol services, proxy call session control function for IP multimedia subsystem services or other suitable packet-switched telecommunications services support. In one exemplary embodiment, session border control is used to provide connectivity between VOIP services end points and channel-switched communications channel end points. In another exemplary embodiment, proxy call session control function processing is used to set up communications sessions using session initiation protocol signaling or other suitable processes.

VOIP server or IMS 134 provide server support for VOIP or IVIS communications sessions.

Auto configuration server 136 provides application layer support for OTT services.

Provisioning and billing system 108 includes business support system (BSS)/operations support system (OSS) 138 and regulatory controls 140. BSS/OSS 138 supports management functions such as network inventory, service provisioning, network configuration and fault management, to support end-to-end telecommunication services. Regulatory controls 140 determines whether an OTT service is permitted for a communications channel as a function of regulatory constraints, such as based on regulatory circles that are used to asses charges for calling between locations.

Non-secure network service provider 110 provides Wi-Fi or other non-secure data network services. In one exemplary embodiment, non-secure network service provider 110 can be a Wi-Fi network services providers in a building, store or other locations, where access to communications channels may be compromised by third parties.

The usage of a cellular call processing system such as IMS can present security risks. For example, if a messaging/voice/video call is going through both the access and core network provided by a mobile operator, the OTT client does not need to encrypt or initiate a virtual private network (VPN) tunnel to make or receive the call, which greatly reduces the processing needs and increases the service scalability. In this manner, the call behavior through the cellular call processor's OTT application is exactly the same as the built-in OEM voice client. However, if the underlying access network is an entrusted data network (e.g. a third party Wi-Fi network), for the OTT client to communicate with the same cellular IMS core network, additional security is provided.

Another specific example for OTT solutions provided by a cellular provider is related to call routing based on the calling and called party locations, and in particular, an associated regulatory region. Under certain regulatory requirements, a native or OTT client application that connects to an IMS system or other similar systems may need to follow predetermined routing rules for offering service with an operator-issued MSISDN. The OTT client application has to determine the right entry point into the IMS network, in order to determine the correct route for accounting and authorization in accordance with these regulatory rules. If the client/device is connected to the operator's network, then the network can authorize and account for the client/device appropriately. If the client/device is connected to any third party network and connects to the messaging/voice/video service, then there is no mechanism to implement the routing requirements as set forth by the regulatory agencies. For example, in India there are 22 "circles" that define regulatory routing regimes and requirements, and the present disclosure provides routing algorithms to ensure that calls are routed in compliance with such regulatory regimes.

The present disclosure provides a process and system that can determine the right route and decide whether additional security is necessary, based on location, network access type and other suitable criteria.

The present disclosure provides an intelligent routing mechanism for messaging, voice and video calling service as an OTT application that leverages the number assigned to the SIM card and seamlessly operates on multiple data networks.

The OTT application/client of the present disclosure is configured using a configuration server that it periodically checks for updates. The OTT application/client has a unique routing algorithms and logic to use location and network type. The details are listed below.

The disclosed OTT application/client of the present disclosure first detects whether it is operating on the secured operator domain (trusted) or is operating on a third party (un-trusted) network. If the OTT application/client is operating in a secured domain, then the application/client directly connects with the IMS UP multimedia subsystem) within the operator's secured domain. If the application/client determines that it is in un-trusted network, then the application/client initiates a secure (encrypted) connection to the IMS that is outside the secure domain. There are additional resources that are consumed on the client and the network to provide services over the un-trusted network.

The client/application then determines the location and connects to the appropriate IMS network over the data network. Even when the handset is attached to the Wi-Fi network, the location information is obtained via the cellular interface of the handset. The cellular interface provides the MCC (Mobile Country Code)/MNC (Mobile Network Code) and cell-id information that is visible to the handset. The application/client monitors the cellular interface while communicating on Wi-Fi to determine the location. Base d on this information, along with the GPS information, the application/client determines if the handset is connected to borne network, roaming domestically or roaming internationally, and initiates the communication to the appropriate IMS.

The IMS network in the client/application can be identified by the P-CSCF (Proxy-Call Session Control Function)/SBC (Session Border Controller) or in other suitable manners. The P-CSCF/SBC address can be stored in the client in the form of a URL address that is ultimately resolved by the DNS (Domain Name Service) in the network, or in other suitable manners. In one exemplary embodiment, P-CSCF/SBC is the entry point into the IMS network. The client can be configured with a range of P-CSCF/SBC addresses which can be updated using the configuration server that die client will select based on the routing algorithm, location and network type.

Figure 2:
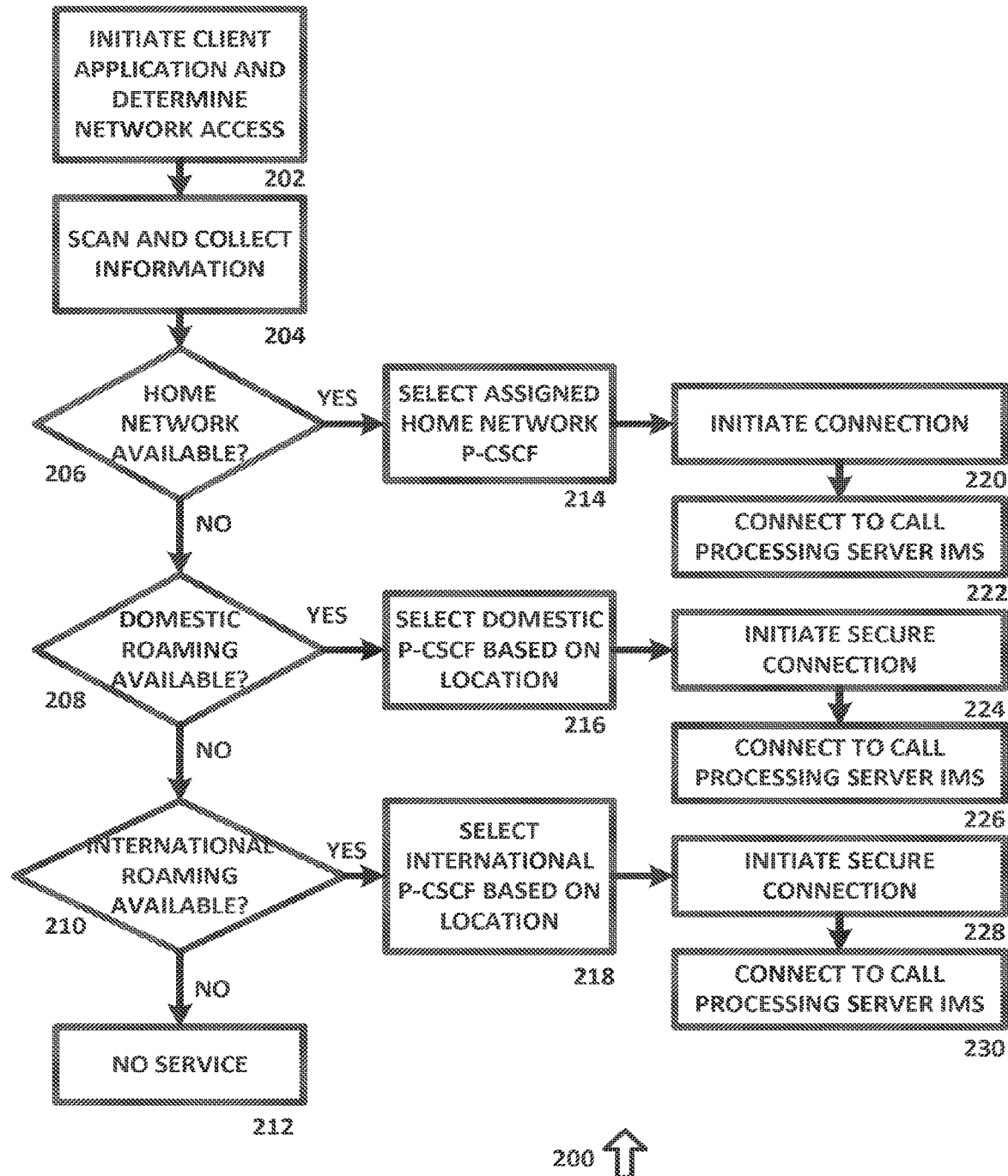
FIG. 2 is a diagram of a routing algorithm for a client application in an OTT client-server architecture, in accordance with the present disclosure.

FIG. 2 is a diagram of a routing algorithm 200 for a client application in an OTT client-server architecture, in accordance with the present disclosure. Algorithm 200 can be implemented in hardware or a suitable combination of hardware and software, and can be one or more software systems operating on a special purpose processor.

Algorithm 200 begins at 202, where a client application is initiated and network access is determined. In one exemplary embodiment, the client application can be an OTT client on a handheld device that is configured to utilize the cellular interface of the handheld device to the cellular service provider network, or other suitable client applications. The client application can be initiated when a user selects an icon for the client application on a handheld device user interface, can be initiated in response to activation of another application on the handheld device, or can be activated in other suitable manners. The algorithm then proceeds to 204, such as after identification of an access network is detected by determining that a data buffer value has been updated, by receipt of a network identifier in an application or in other suitable manners.

At 204, information is obtained by scanning one or more data registers, transmitting diagnostic messages and collecting data generated in response to the diagnostic messages or in other suitable manners. In one exemplary embodiment, location data can be queried from a GPS utility operating on a handheld device. In another exemplary embodiment, an Internet Control Message Protocol (ICMP) diagnostic message can be generated. The algorithm then proceeds to 206, such as after a response to all information gathering routines or queries is received.

At 206, it is determined whether a home network is available. In one exemplary embodiment, a handheld device can be configured for a cellular service provider network that is identified as a home network, or another suitable network can be associated with home network status. If it is determined that a home network is available, the algorithm proceeds to 214, such as by executing one or more lines of code in response to a data value stored in a buffer, a change in variable value or in other suitable manners.

At 214, the assigned home network P-CSCF is selected. The algorithm then proceeds to 220, where the connection is initiated, and the algorithm proceeds to 222, where a connection is made to the call processing server for IMS.

If it is determined at 206 that a home network is not available, the algorithm proceeds to 208, where it is determined whether domestic roaming is available. In one exemplary embodiment, data fields associated with a service plan that is affiliated with a user account for the handheld device can be queried to determine a value stored in the data fields, where the data field has a predetermined value or set of values if domestic roaming is available. If it is determined that domestic roaming is available, the algorithm proceeds to 216, such as by executing one or more lines of code in response to a data value stored in a buffer, a change in variable value or in other suitable manners.

At 216, a domestic network P-CSCF is selected as a function of a location of the handheld device. The algorithm then proceeds to 224, where a secure connection is initiated. For example, a VPN connection can be set up, encryption can be configured or other suitable processes can be implemented. The algorithm then proceeds to 226, where a connection is made to the call processing server for IMS.

If it is determined at 208 that domestic roaming is not available, the algorithm proceeds to 210, where it is determined whether international roaming is available. In one exemplary embodiment, data fields associated with a service plan that is affiliated with a user account for the handheld device can be queried to determine a value stored in the data fields, where the data field has a predetermined value or set of values if international roaming is available. If it is determined that international roaming is available, the algorithm proceeds to 218, such as by executing one or more lines of code in response to a data value stored in a buffer, a change in variable value or in other suitable manners.

At 218, an international network P-CSCF is selected as a function of a location of the handheld device. The algorithm then proceeds to 228, where a secure connection is initiated. For example, a VPN connection can be set up, encryption can be configured or other suitable processes can be implemented. The algorithm then proceeds to 230, where a connection is made to the call processing server for IMS.

If it is determined at 210 that international roaming is not available, the algorithm proceeds to 212, where a user is notified that there is no service currently available, or where other suitable processes are also or alternatively implemented.

Although algorithm 200 is shown as a flow chart, state diagrams, objected-oriented programming or other suitable programming conventions can also or alternatively be used. Likewise, the order of steps or processes and the specific functions shown are exemplary, and other suitable orders or steps or processes can also or alternatively be used.

The current solution in the market is a standard implementation, where the network decides which IMS the client/device connects to. There is one P-CSCF/SBC address that is provided to the client. The clients in the market are not configured to handle multiple P-CSCF's, nor do they have the routing logic to pick the appropriate P-CSCF/SBC based on radio interface layer, location/GPS and mobile country code (MCC) or mobile network code (MNC). In the proposed solution, algorithmic logic is embedded within the client to initiate routing to a specific destination.

The standard implementations that are currently present in the market will work if they are accessing the service over cellular data network within the operator domain. However the current solution will not work if these services have to be extended over the third party entrusted (especially Wi-Fi) network while providing the same level of security and traceability as in operator network.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wireless communications device, comprising:
   a processor configured to load one or more first instructions from a memory device that cause the processor to perform data security processing for a wireless communications channel to generate secured data;
   the processor configured to load one or more second instructions from the memory device that cause the processor to detect a location of the wireless communications device; and
   the processor configured to load one or more third instructions from the memory device that cause the processor to route the secured data over the wireless communications channel as a function of the location;
   wherein the one or more third instructions from the memory device cause the processor to select whether to route the secured data over the wireless communications channel using a non-secure network service provider or a carrier controller network in response to a control signal generated by a carrier over the top server.

2. The wireless communications device of claim 1 wherein the one or more third instructions from the memory device cause the processor to select whether to route the secured data over the wireless communications channel using the non-secure network service provider or the carrier controller network in response to a control signal generated by a security system of a carrier over the top server.

3. The wireless communications device of claim 1 wherein the one or more third instructions from the memory device cause the processor to select whether to route the secured data over the wireless communications channel using the non-secure network service provider or the carrier controller network in response to a control signal generated by a session mobility system of a carrier over the top server.

4. The wireless communications device of claim 1 wherein the one or more third instructions from the memory device cause the processor to select whether to route the secured data over the wireless communications channel using the non-secure network service provider or the carrier controller network in response to a control signal generated by an auto-configuration system of a carrier over the top server.

5. The wireless communications device of claim 1 wherein the one or more third instructions from the memory device cause the processor to select whether to route the secured data over the wireless communications channel using the non-secure network service provider or the carrier controller network in response to a control signal generated by a session border control system of a carrier over the top server.

6. The wireless communications device of claim 1 wherein the one or more third instructions from the memory device cause the processor to select whether to route the secured data over the wireless communications channel using the non-secure network service provider or the carrier controller network in response to a control signal generated by an IP multimedia system of a carrier over the top server.

7. The wireless communications device of claim 1 wherein the one or more third instructions from the memory device cause the processor to select whether to route the secured data over the wireless communications channel using the non-secure network service provider or the carrier controller network in response to a control signal generated by a national roaming over the top server that is accessed by a carrier over the top server.

8. The wireless communications device of claim 1 wherein the one or more third instructions from the memory device cause the processor to select whether to route the secured data over the wireless communications channel using the non-secure network service provider or the carrier controller network in response to a control signal generated by an international roaming over the top server that is accessed by a carrier over the top server.

9. The wireless communications device of claim 1 wherein the one or more third instructions from the memory device cause the processor to select whether to route the secured data over the wireless communications channel using the non-secure network service provider or the carrier controller network in response to a control signal generated by a regulatory controls system that is accessed by a carrier over the top server.

10. A method for wireless communications, comprising:
loading one or more first instructions into a processor from a memory device that cause the processor to perform data security processing for a wireless communications channel to generate secured data;
one or more second instructions into the processor from the memory device that cause the processor to detect a location of a wireless communications device; and
loading one or more third instructions from the memory device that cause the processor to route the secured data over the wireless communications channel as a function of the location;
wherein the one or more third instructions from the memory device cause the processor to select whether to route the secured data over the wireless communications channel using a non-secure network service provider or a carrier controller network in response to a control signal generated by a carrier over the top server.

11. The method of claim 10 wherein the one or more third instructions from the memory device cause the processor to select whether to route the secured data over the wireless communications channel using the non-secure network service provider or the carrier controller network in response to a control signal generated by a security system of a carrier over the top server.

12. The method of claim 10 wherein the one or more third instructions from the memory device cause the processor to select whether to route the secured data over the wireless communications channel using the non-secure network service provider or the carrier controller network in response to a control signal generated by a session mobility system of a carrier over the top server.

13. The method of claim 10 wherein the one or more third instructions from the memory device cause the processor to select whether to route the secured data over the wireless communications channel using the non-secure network service provider or the carrier controller network in response to a control signal generated by an auto-configuration system of a carrier over the top server.

14. The method of claim 10 wherein the one or more third instructions from the memory device cause the processor to select whether to route the secured data over the wireless communications channel using the non-secure network service provider or the carrier controller network in response to a control signal generated by a session border control system of a carrier over the top server.

15. The method of claim 10 wherein the one or more third instructions from the memory device cause the processor to select whether to route the secured data over the wireless communications channel using the non-secure network service provider or the carrier controller network in response to a control signal generated by an IP multimedia system of a carrier over the top server.

16. The method of claim 10 wherein the one or more third instructions from the memory device cause the processor to select whether to route the secured data over the wireless communications channel using the non-secure network service provider or the carrier controller network in response to a control signal generated by a national roaming over the top server that is accessed by a carrier over the top server.

17. The method of claim 10 wherein the one or more third instructions from the memory device cause the processor to select whether to route the secured data over the wireless communications channel using the non-secure network service provider or the carrier controller network in response to a control signal generated by an international roaming over the top server that is accessed by a carrier over the top server.

18. The method of claim 10 wherein the one or more third instructions from the memory device cause the processor to select whether to route the secured data over the wireless communications channel using the non-secure network service provider or the carrier controller network in response to a control signal generated by a regulatory controls system that is accessed by a carrier over the top server.

19. A method for wireless communications, comprising:
loading one or more first instructions into a processor from a memory device that cause the processor to perform data security processing for a wireless communications channel to generate secured data;
one or more second instructions into the processor from the memory device that cause the processor to detect a location of a wireless communications device; and
loading one or more third instructions from the memory device that cause the processor to route the secured data over the wireless communications channel as a function of the location;
wherein the one or more third instructions from the memory device cause the processor to select whether to route the secured data over the wireless communications channel using a non-secure network service provider or a carrier controller network in response to a control signal.

20. The method of claim 19 wherein the one or more third instructions from the memory device cause the processor to select whether to route the secured data over the wireless communications channel using a non-secure network service provider or a carrier controller network in response to a control signal generated by an external system.

* * * * *

UNITED STATES PATENT AND TRADEMARK OFFICE
CERTIFICATE OF CORRECTION

| | |
|---|---|
| PATENT NO. | : 11,431,760 B2 |
| APPLICATION NO. | : 17/080266 |
| DATED | : August 30, 2022 |
| INVENTOR(S) | : Gautam Reddy et al. |

It is certified that error appears in the above-identified patent and that said Letters Patent is hereby corrected as shown below:

In the Claims

1. In Column 12, Lines 50-51, in Claim 20, delete "a non-secure network service provider" and insert -- the non-secure network service provider --, therefor.
2. In Column 12, Line 51, in Claim 20, delete "a carrier controller network" and insert -- the carrier controller network --, therefor.

Signed and Sealed this
Twenty-ninth Day of November, 2022

Katherine Kelly Vidal
*Director of the United States Patent and Trademark Office*